United States Patent

[11] 3,590,652

| [72] | Inventor | Robert E. Strang<br>R.R. 2, North Liberty, Ind. 46554 |
|---|---|---|
| [21] | Appl. No. | 874,357 |
| [22] | Filed | Nov. 5, 1969 |
| [45] | Patented | July 6, 1971<br>Continuation-in-part of application Ser. No. 617,002, Jan. 27, 1967, now abandoned. |

[54] SLEEVE AND BUSHING STRUCTURE FOR A TORQUE ARM SPEED REDUCER
8 Claims, 4 Drawing Figs.

[52] U.S. Cl. ................................................ 74/421,
287/52.06
[51] Int. Cl. ....................................................... F16n 1/20
[50] Field of Search ........................................... 74/421;
287/52.06, 52.04, 52.07, 114

[56] References Cited
UNITED STATES PATENTS

| 2,331,498 | 10/1943 | Otto | 287/52.06 |
| 2,524,027 | 10/1950 | Blackmarr | 287/52.06 |
| 2,669,471 | 2/1954 | Breslow | 287/52.06 |
| 2,811,861 | 11/1957 | Rieser | 74/421 |
| 3,257,070 | 6/1966 | Kuklinski | 287/52.06 |

FOREIGN PATENTS

| 121,613 | 6/1946 | Australia | 287/52.06 |

Primary Examiner—Thomas F. Callaghan
Assistant Examiner—Andrew V. Kundrat
Attorneys—Marmaduke A. Hobbs and Kemon, Palmer, Stewart & Estabrook ABSTRACT: The combination of a shaft-mounted speed reducer and a sleeve and bushing structure therefor, in which a sleeve having a bore therein is concentrically mounted on a shaft and secured thereto by split bushings at each end of the sleeve extending into the bore and urged into securing position by a plurality of screws extending through the bushing into a collar on the sleeve at each end thereof. The collars are rotatable relative to each other and to the sleeve on which they are mounted.

INVENTOR.
ROBERT E. STRANG
BY
M. A. Hobbs
ATTORNEY

*INVENTOR.*
ROBERT E. STRANG
BY
*M. A. Hobbs*
ATTORNEY

SLEEVE AND BUSHING STRUCTURE FOR A TORQUE ARM SPEED REDUCER

This application is a continuation in part of application Ser. No. 617,002 filed Jan. 27, 1967, and now abandoned.

In a number of conventional power transmission installations, a speed reducer or other drive unit is mounted on and supported by the end of a shaft extending outwardly from the driven equipment, machine or other driven assembly, and the speed reducer, for example, is torque mounted and is driven by a motor through a multiple V-belt arrangement. In a number of drives, the shaft extends through the sleeve of the drive and the sleeve is secured to the shaft by a setscrew at each end of the sleeve which seats on the shaft extension. Since, however, a small amount of clearance is required between the sleeve and shaft, the setscrews inherently cause the sleeve to be nonconcentrically mounted on the shaft, and hence a slight wobble often occurs in the torque-mounted drive as a result of the shaft and sleeve axial offset created by the tightened setscrews. Various types of securing means have been used which give substantial concentricity between the sleeve and shaft, but these prior securing means have had certain inherent disadvantages, including unreliability of the securing means, difficulty in making installations, and the occurrence of fretting between the shaft and parts of the securing means, resulting in freezing of the shaft and securing means parts such that the drive cannot easily be removed from the shaft after the securing means has been loosened. It is therefore one of the principal objects of the invention to provide a sleeve and bushing structure for securing a drive unit or element to a shaft, which secures the drive unit or element concentrically to the shaft at both ends of the sleeve and prevents any misalignment between the drive and shaft, and which prevents or minimizes wobble and vibration of the unit or element on the shaft.

Another object of the invention is to provide a sleeve and bushing structure of the type which encircles and grips the shaft and which can readily be disengaged from the shaft, and the drive unit or element easily and quickly removed from the shaft, notwithstanding a tendency of the encircling parts to freeze and adhere to the shaft.

Still another object of the invention is to provide a sleeve and bushing structure which is relatively simple in construction and is easily assembled on and removed from a drive unit or element, and which provides an effective securing relationship between the sleeve and shaft at both ends of the sleeve and does not produce any appreciable scoring or marring of the shaft.

A further object is to provide a structure of the aforesaid type which is adaptable to a variety of different types of drives and drive elements, and which can be mounted on and used with a number of conventional drives without any substantial changes or redesigning being required in the structure of the drives and drive elements.

Additional objects and advantages of the invention will become apparent from the following description and accompanying drawings, wherein.

Figure 1:
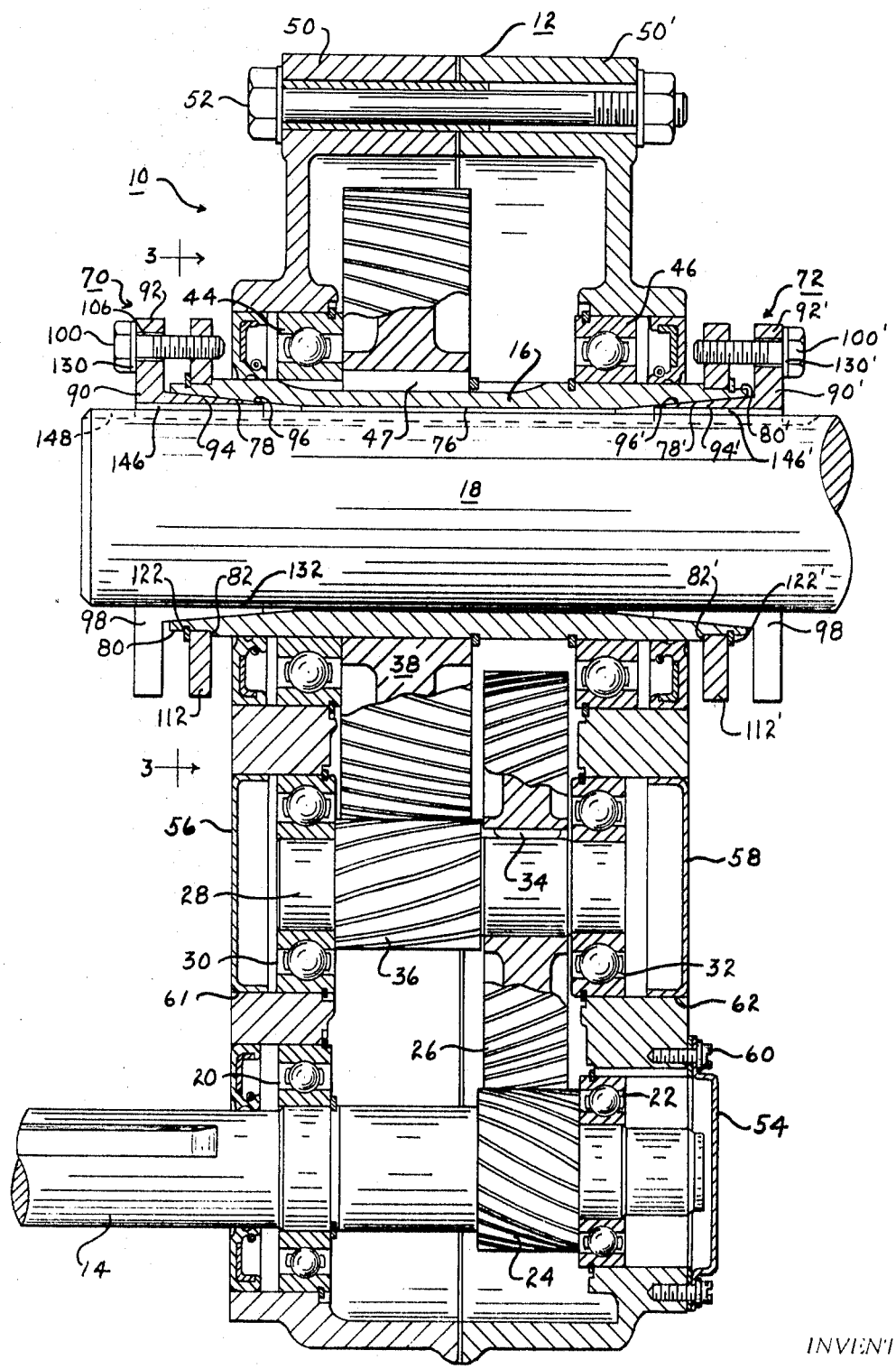
FIG. 1 is a vertical, cross-sectional view of a speed reducer having incorporated therein a sleeve and bushing structure embodying the present invention, with the parts of the speed reducer being rearranged for the purpose of illustrating the entire structure, the operative relationship between the parts otherwise being maintained throughout.

Referring more specifically to the drawings, and to FIG. 1 in particular, numeral 10 designates generally the present speed reducer having a housing 12, an input shaft 14 and a sleeve 16 connected by a train of gears to the input shaft and forming the output element of the reducer. The speed reducer is normally driven by an electric motor through a belt trained on a sheave on the motor shaft and a sheave on shaft 14. Sleeve 16 is mounted on shaft 18 which, for the present illustration, may be a shaft of any one of a number of machines or pieces of equipment capable of being effectively driven by the speed reducer having the present invention embodied therein. The speed reducer is supported by the shaft and is provided with a torque arm anchored to a suitable rigid support which holds the speed reducer in a predetermined position in opposition to the torque transmitted from the motor through shaft 14 and the gear trained to sleeve 16 and shaft 18.

In the speed reducer, shaft 14 is journaled in housing 12 on ball bearings 20 and 22 and is provided with a small gear 24 for meshing with large gear 26, the latter gear being mounted on idle shaft 28 journaled in the housing on ball bearings 30 and 32, gear 26 being secured for rotation therewith by a key 34. Shaft 28 contains a small gear 36 which meshes with a large gear 38 the hub 37 of which is rigidly secured to sleeve 16 journaled in the housing on ball bearings 44 and 46, gear 38 being keyed to sleeve 16 by key 47. The housing is normally made into sections 50 and 50' secured together by a plurality of bolts 52 extending through holes in a plurality of bosses spaced around the periphery of the housing. In order to give immediate access to the various bearings and shafts 14 and 28, openings with covers 54, 56 and 58 are provided, the cover 54 being secured to the housing by a plurality of bolts 60 and covers 56 and 58 being seated in openings 61 and 62. A description of other details of the speed reducer, apart from the sleeve and bushing and securing means formed thereby, is not necessary in order to fully understand the invention, and the remaining parts of the reducer may be considered conventional with respect to speed reducers of this type.

The speed reducer is secured to shaft 18 by securing means 70 and 72 which include the end portions of the sleeve and split bushings inserted therein, and which cooperate with one another to obtain full concentricity between the sleeve and shaft and to hold the shaft and sleeve in axial alignment with one another throughout the operation of the speed reducer and equipment driven thereby. The two securing means 70 and 72 are normally the same in construction and operation, and hence the parts of securing means 72 will be given the same numbers plus primes as those used in referring to the parts of securing means 70. The two securing means are required in order to obtain the aforementioned concentricity and optimum performance of the speed reducer. Sleeve 16 defines a central bore having cylindrical sidewall 76 along the center portion thereof and tapered ends formed by outwardly flaring inner walls 78 and 78', the two tapered walls having the same taper and being the same length. The two external ends of the sleeve are provided with reduced-diameter portions 80 and 80' forming outwardly facing shoulders 82 and 82' on the external surface of the sleeve. Split bushings 90 and 90' are mounted in the respective ends of sleeve 16, each having an outwardly extending flange 92 and an axially extending sleeve 94, the sleeve being tapered at portion 96 to correspond to the taper on the inner surface 78 of the sleeve so that the two tapered surfaces will engage one another face-to-face contact throughout substantially the full length of the sleeve. A slot 98 extends the full width of flange 92 and the full length of sleeve 94 and is sufficiently wide to permit the bushing to contract firmly about shaft 18 when it is urged into the end of the sleeve during the securing operation.

The bushings are urged into the two ends of the sleeve, and tapered surfaces 78 and 96 are urged into face-to-face contact with sufficient force to contract the bushing, by three capscrews 100, 102, and 104 extending through holes 106, 108 and 110 in flange 92. Tap rings 112 and 112' mounted on the ends of the sleeve contain tapped holes 114, 116 and 120 for receiving screws 100, 102 and 104. The ring is held in place on the end of the sleeve and against the force of the screws by shoulder 82 and a snap ring 122 forming a retainer and an abutment for the tap ring 112, firmly holding the ring in place on the sleeve and preventing axial movement thereon. While the tap ring 112 may be disassembled if necessary to repair the securing means, it normally remains permanently mounted on the end of the sleeve after snap ring 122 has been assembled in place on the sleeve.

Figure 2:
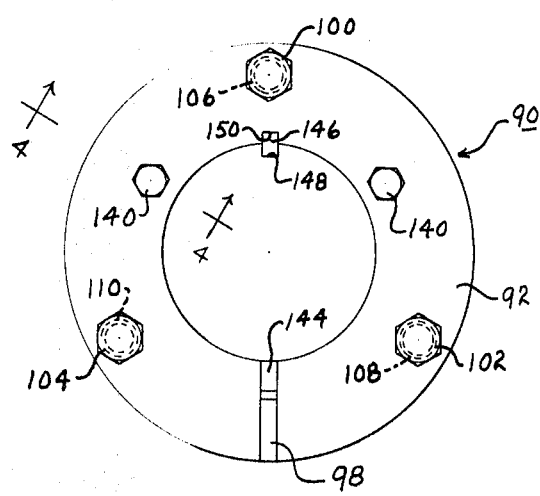
FIG. 2 is an enlarged and elevational view of the sleeve and bushing structure having embodied therein a securing means for attaching the speed reducer to a shaft.
Figure 3:
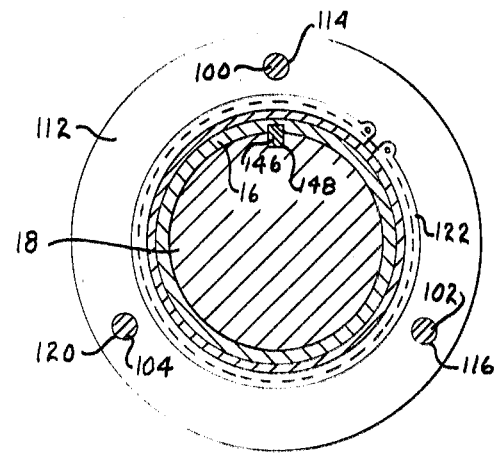
FIG. 3 is a vertical, cross-sectional view of the sleeve and securing structure, the section being taken on line 3–3 of FIG. 1.

The holes 106, 108 and 110 in flange 92 for screws 100, 102 and 104, respectively, are substantially larger than the screw shafts, as can be seen from FIGS. 1 and 2, to permit the bushing to contract without any interference from the screws, when the screws are tightened during the assembly operation and the two tapered surfaces 78 and 96 are forced together by the inward movement of sleeve 94 into the sleeve. In the securing operation, the screws are threaded into the tapped holes of tap ring 112, and as the screws are tightened, the heads seat on the external surface of flange 92 and urge the bushing inwardly toward the sleeve. A lockwasher 130 is preferably inserted between the head if each screw and the adjacent face of flange 92 in order to lock the screws in adjusted position after an installation has been made.

Figure 4:
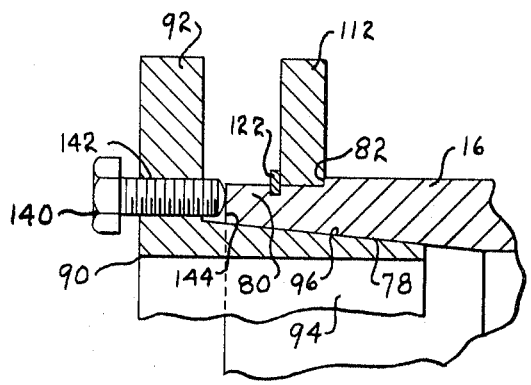
FIG. 4 is an enlarged fragmentary cross-sectional view of the sleeve and bushing forming the securing means, the view being taken on line 4–4 of FIG. 2.

Since there is a tendency for the two tapered surfaces to adhere to one another and the inner cylindrical surface 132 of the bushing to adhere to the shaft, a jackscrew is preferably provided in each securing means in order to disengage the bushing from the tapered surface 78 on the sleeve and from the external surface of the shaft. As seen in FIG. 4, jackscrew 140 extends through a threaded hole 142 in flange 92 and abuts against the end 144 of the sleeve. Two such screws and the respective holes are preferably provided for the removal operation and the holes would normally be spaced equally between the holes for securing screws 100, 102 and 104. As screws 140 are tightened against the end of the sleeve, the bushing is urged outwardly therefrom, permitting the bushing to expand and disengage itself from the external surface of the shaft. In an alternative arrangement, boltholes 142 may be spaced outwardly in flange 92 sufficiently to permit the screws 140 to engage the surface of tap ring 112 when they are tightened in the disassembly operation. The relative location of holes 142 to holes 106, 108 and 110 would otherwise remain substantially the same. A greater number of securing bolts may be used, for example four instead of three, if desired, and a different number of jackscrews 140 may be used in larger installations if required.

The two rings 112 and 112' are rotatable relative to one another which facilitates the assembling and securing of the speed reducer on the shaft. In one method of mounting a speed reducer unit, particularly a large unit, on a shaft, the inner bushing is first slipped onto the shaft, the speed reducer and sleeve are mounted on the shaft, and the outer bushing is then mounted on the shaft. The screws of the two bushings are then screwed into the threaded holes of rings 112 and 112'. With the bushings of the fully split construction, achieving and maintaining true alignment of the screws on threaded holes during the screw-tightening operation is materially facilitated by the relative rotation of rings 112 and 112' with respect to one another and with respect to the sleeve. This permits adjustment of the screwhole alignment at each end of the sleeve independently of the bushing and ring at the opposite end, thus permitting effective and easy adjustment of each ring relative to the respective bushing after the two bushings have started to grip the shaft and sleeve. Adjustment of the ring with respect to the bushing is of further importance with the fully split bushings in that, as the bushing contracts during the tightening operation, the holes nearest the slot through the bushings tend to shift circumferentially and to create difficulty in aligning the respective screws and holes. This difficulty is minimized by the rotatability of the respective rings relative to the bushing and when they are gripping the shaft and the tapered surface of the sleeve.

In the assembly, operation and use of the present sleeve and bushing structure, as illustrated by the speed reducer installation shown in the drawings, bushings 90 and 90' may be assembled in the respective ends of sleeve 16, either before or after the parts and reducer are mounted on the shaft, and screws 100, 102 and 104 are inserted through enlarged holes 106, 108 and 110 into threaded holes 114, 116 and 120 of tap ring 112. The screws, however, are not tightened with sufficient force to cause the bushing to contract. The speed reducer is then mounted on shaft extension 18 and located in the proper position, and screws 100, 102 and 104 of each of the securing means 70 and 72 are tightened, causing the two tapered surfaces 96 and 96' to slide in face-to-face contact with tapered surfaces 78 and 78' and thereby causing the bushing to contract onto the shaft. The bushing contracts substantially uniformly throughout the circumference of the shaft and engages the shaft throughout substantially its full circumference. Since the contraction is substantially uniform from all angular positions of the bushing, the axis of the sleeve is inherently aligned with the axis of the shaft, thereby providing the concentricity between the two elements necessary for smooth, nonwobbling operation of the reducer on the shaft. Since the screws hold the bushings firmly in place after they have been tightened, the securing means 70 and 72 maintain the sleeve securely in position on the shaft throughout the operation of the speed reducer. While the gripping action between the bushing and the shaft and sleeve may be sufficient to transmit the torque, keys 146 and 146' and keyways 148 and 150 are preferably used.

When the speed reducer is to be removed from the shaft, screws 100, 102 and 104 are first loosened substantially or removed from ring 112 and flange 92, and jackscrews 140 are inserted in holes 142 and tightened until they seat firmly against end surface 144 of the sleeve. Further tightening of screws 140 forces the bushing outwardly and urges the two tapered surfaces 78 and 96 apart, permitting the bushing to expand and release itself from the surface of shaft 18. After the two securing means 70 and 72 have been released in the foregoing manner, the speed reducer can be readily removed from the shaft without any interference from the securing means.

The present type of securing means not only obtains concentricity between the sleeve and the shaft but provides an effective circumferential gripping means on the shaft and affords a large area for effective face-to-face contact between the bushing and the sleeve and between the bushing and the shaft. Further, the present type of securing means does not score or mar the shaft, such as often results from the use of the conventional setscrews in prior installations, and will readily release the shaft and sleeve even though freezing of the parts may have occurred. While the present sleeve and bushing structure has been illustrated in connection with a speed reducer, it can be used effectively in various types of drives and installations.

Only one specific embodiment of the present sleeve and bushing structure has been described in detail herein; however, various changes and modifications may be made without departing from the scope of the invention.

I claim:

1. In combination with a speed reducer mountable on and supported by a single shaft and having a housing and gear therein with a hub, a substantially cylindrically shaped sleeve of relatively thin walled construction extending through said housing and gear for receiving the shaft internally and the hub of said gear externally, said sleeve having at each end an inwardly tapering internal surface, a split bushing in each end of said hub having a portion with an external tapered surface corresponding to the tapered surface in said sleeve for engagement therewith and a radially extending flange having a plurality of holes and being connected to the outer end of said tapered portion, said tapered portion and radially extending flanges having a slit along one side extending axially and radially therethrough, rings rotatably mounted on the ends of said sleeve for relative rotation with respect to said sleeve and both bushings and having a plurality of threaded holes therein corresponding to the holes in the flanges of said bushings, a means for retaining said rings on the ends of said sleeve, and screws extending through the holes in said flanges into the threaded holes in said rings for urging said tapered portions into engagement with the respective tapering surface in said sleeve and contracting said bushings onto said shaft.

2. A combination defined in claim 1 in which said sleeve is provided with a reduced-diameter portion at each end for receiving said rings.

3. A combination defined in claim 2 in which the sleeve is provided with a radially extending shoulder at the inner end of said reduced-diameter portion.

4. A combination defined in claim 1 in which the means for holding the rings in place on the ends of the bushing include an annular groove and a snap ring disposed in said annular groove.

5. A combination defined in claim 3 in which the means for holding the rings in place on the ends of the bushing include an annular groove and a snap ring disposed in said annular groove.

6. The combination as defined in claim 1 in which the holes in said radially extending flanges are substantially larger than the diameter of the screws extending therethrough.

7. The combination as defined in claim 1 in which said shaft and bushing include keyways and a key therefor.

8. The combination as defined in claim 1 in which said rings are of continuous construction and are free to rotate on the ends of said sleeve and in which said flanges contain three substantially equally spaced smooth-walled holes for receiving said screws, of a larger diameter than said screws.